(12) United States Patent
Dombrovski (10) Patent No.: US 7,291,958 B2
(45) Date of Patent: Nov. 6, 2007

(54) ROTATING BACK IRON FOR SYNCHRONOUS MOTORS/GENERATORS

(75) Inventor: Viatcheslav V. Dombrovski, Willoughby Hills, OH (US)

(73) Assignee: Reliance Electric Technologies LLC, Greenville, SC (US)

( * ) Notice: Subject to any disclaimer, the term of this patent is extended or adjusted under 35 U.S.C. 154(b) by 170 days.

(21) Appl. No.: 10/159,074

(22) Filed: May 31, 2002

(65) Prior Publication Data

US 2003/0030339 A1 Feb. 13, 2003

(51) Int. Cl.
*H02K 1/22* (2006.01)
(52) U.S. Cl. .......................... 310/261; 310/91
(58) Field of Classification Search ............. 310/261, 310/91, 156, 254, 52, 64
See application file for complete search history.

(56) References Cited

U.S. PATENT DOCUMENTS

| | | | |
|---|---|---|---|
| 3,763,552 A | | 10/1973 | Brown et al. |
| 4,200,817 A | * | 4/1980 | Bratoljic ....................... 310/198 |
| 4,604,540 A | * | 8/1986 | Fukami ................. 310/154.06 |
| 4,959,578 A | * | 9/1990 | Varga .......................... 310/268 |
| 5,057,726 A | * | 10/1991 | Mole et al. ................ 310/67 R |
| 5,668,090 A | | 9/1997 | Kalsi |
| 5,726,516 A | * | 3/1998 | Randall ....................... 310/261 |
| 5,743,352 A | * | 4/1998 | Miller et al. ................. 180/446 |
| 5,753,989 A | * | 5/1998 | Syverson et al. ........... 310/114 |
| 5,777,420 A | * | 7/1998 | Gamble et al. ............. 310/261 |
| 6,147,429 A | | 11/2000 | Akemakou et al. |
| 6,445,105 B1 | * | 9/2002 | Kliman et al. .............. 310/268 |

OTHER PUBLICATIONS

Dr. Anthony Anderson; "Generator Core Failures", http://www.antony-anderson.com/failure1.htm; p. 1-7, Dec. 1, 2001.

* cited by examiner

*Primary Examiner*—Dang Le
*Assistant Examiner*—Nguyen Hanh
(74) *Attorney, Agent, or Firm*—Thompson Coburn LLP (57) ABSTRACT

The present invention relates to systems and methods for a synchronous motor/generator including at least one back iron element which is rotated along with a rotor of the motor/generator. Rotation of the back iron(s) mitigates eddy current losses and improves efficiency in the motor/generator. The motor/generator also includes at least one stator winding supported in a non-conductive structure attached to the machine frame. The motor/generator of the present invention can also include at least one permanent magnet located in the rotor. The permanent magnet(s) cooperates with rotor windings to generate a DC magnetic field for the rotor. The components of the motor/generator can be configured in an axial gap topology, radial gap topology, or any other suitable topology.

22 Claims, 9 Drawing Sheets

ROTATING BACK IRON FOR SYNCHRONOUS MOTORS/GENERATORS

CROSS REFERENCE TO RELATED APPLICATIONS

This application claims the benefit of U.S. patent application Ser. No. 09/932,755 filed Aug. 17, 2001 and entitled HYBRID SUPERCONDUCTING MOTOR/GENERATOR, which is a continuation of U.S. patent application Ser. No. 09/570,249 filed on May 12, 2000 and entitled HYBRID SUPERCONDUCTING MOTOR/GENERATOR, the entireties of which are incorporated herein by reference.

FIELD OF THE INVENTION

The invention described below generally relates to synchronous machines, and more particularly, to systems and methods for rotating a back iron to mitigate losses in synchronous machines.

BACKGROUND OF THE INVENTION

Recent advances in superconductivity have led to an increased interest in the development and commercialization of superconducting electromechanical rotating (SER) devices such as large electric generators and large electric motors, including synchronous AC motors. Such devices typically include a superconductive rotor having a vacuum jacket and a stator coaxially surrounding the rotor. The superconducting coils are disposed inside of the vacuum jacket on a coil support structure. The coil support structure and coils are cooled to a cryogenic temperature. One such device is a high temperature superconducting (HTS) electromechanical device which uses a HTS winding in the rotor of the device rather than a low temperature superconducting winding. In the case of a synchronous AC motor, the stator and rotor of the typical SER device are configured such that the rotor is rotated synchronously by rotating the stator magnetic field.

The superconducting synchronous motors generally have an air-core geometry, which possess problems with end-winding and core end region eddy current losses due to a higher than normal leakage fields. Axial fluxes caused by circumferential currents flowing in the rotor and stator end windings are sufficiently great to induce significant eddy currents in laminations at each end of a stator core and in core clamping plates. The circumferential/radial eddy currents generate high losses in the motors.

Various methods used to minimize eddy current losses in the core end regions are: (1) conducting screens on core end plates to act as flux diverters; (2) profiling an end of the core, e.g., locally increasing the reluctance of the rotor/stator gap; (3) segmentation of the laminations; (4) using narrow slits—"pistoye slots"—in rotor teeth to lengthen a path taken by the eddy currents, thereby increasing path resistance and decreasing current/losses; and (5) using extra coatings of insulating varnish on the laminations. Thus, core end region design is conventionally employed as a compromise between keeping the eddy current losses small yet maintaining adequate magnetic, thermal and mechanical properties.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

The present invention provides a system to mitigate losses and improve efficiency in rotating synchronous machines. Eddy current losses are commonly found in synchronous motors having an air-core geometry. In conventional air-core motors, magnetic flux, which generates eddy current losses, passes across an air gap that separates stationary and moving components of the motors. To mitigate such losses, a motor/generator is provided that includes at least one rotating back iron. The back iron(s) is coupled to a drive shaft of the motor/generator and thus, is operable to rotate with rotor. Because the back iron(s) is not stationary, DC fields, rather than AC fields, are produced by rotating windings in the rotor. Accordingly, AC losses in the motor/generator will be mitigated and hence axial gap and radial gap topologies described herein facilitate improved flux containment over conventional topologies.

The motor/generator of the present invention can also include at least one permanent magnet located in the rotor. The permanent magnet(s) cooperates with rotor windings to generate a DC magnetic field for the rotor. The permanent magnet(s) also facilitates reduction of flux density perpendicular to the rotor windings. Operation of the motor/generator is also facilitated by the permanent magnet(s) when the rotor windings are not operational. A further benefit of the permanent magnet(s) is that the rotor can be configured with the permanent magnet(s) in a non-magnetized state. The rotor windings can then be used to magnetize the permanent magnet(s).

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to systems and methods for a synchronous motor/generator including a stator winding supported in a non-conductive structure attached to the machine frame and a back iron element, which is rotated along with a rotor. The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Figure 1:
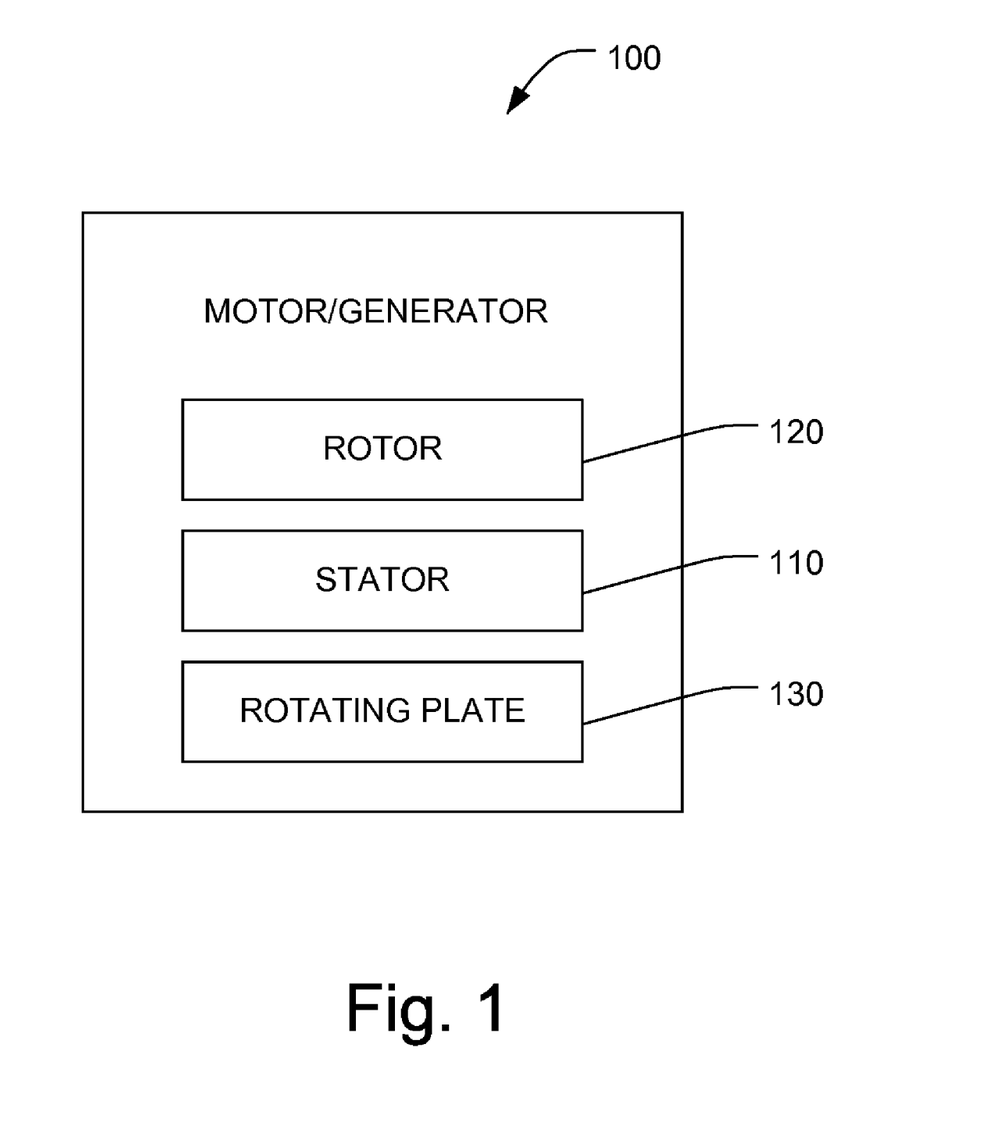
FIG. 1 is a schematic block diagram of a motor/generator having a rotating back iron in accordance with an aspect of the present invention.

FIG. 1 illustrates a synchronous machine, such as a motor/generator, 100 in accordance with an aspect of the present invention. The motor/generator 100 includes a stator 110 and a rotor 120. The stator 110 is selectively energizable with an electric current to drive the rotor 120 to rotate. Generally, when the rotor 120 rotates, AC fields are created across stationary components of the motor/generator, producing eddy current losses. In conventional motor/generators, a stationary back iron is employed to contain magnetic fields within the machine so that the fields do not product additional losses and other undesirable effects outside of the motor/generator. However, when such a component is stationary, the rotating magnetic fields can cause undesirable losses in the motor/generator.

Accordingly, the motor/generator 100 of the present invention includes a rotating back iron 130 to mitigate such losses. The back iron 130 can be shaped especially to mitigate the losses in a magnetic core, frame and stator winding support structure for a rotating magnetic field created by the at least one rotor winding and a polyphase stator winding. Further, the back iron 130 increases the strength of magnetic fields that are produced by stator and rotor windings and any permanent magnets on the rotor, hence increasing torque-production capability of the machine. The back iron also shields an external environment from magnetic fields produced within the machine, which is important for many reasons, including loss reduction. The back iron 130 is rotated with the rotor 120. Thus, AC fields in the back iron structure 130 are mitigated, as are the losses associated with the AC fields, improving performance of the motor/generator 100. Accordingly, unlike conventional methods developed to minimize eddy current losses in the core end regions, the present invention facilitates keeping eddy current losses small, as well as, maintaining magnetic, thermal, and mechanical properties of the motor/generator.

Figure 2:
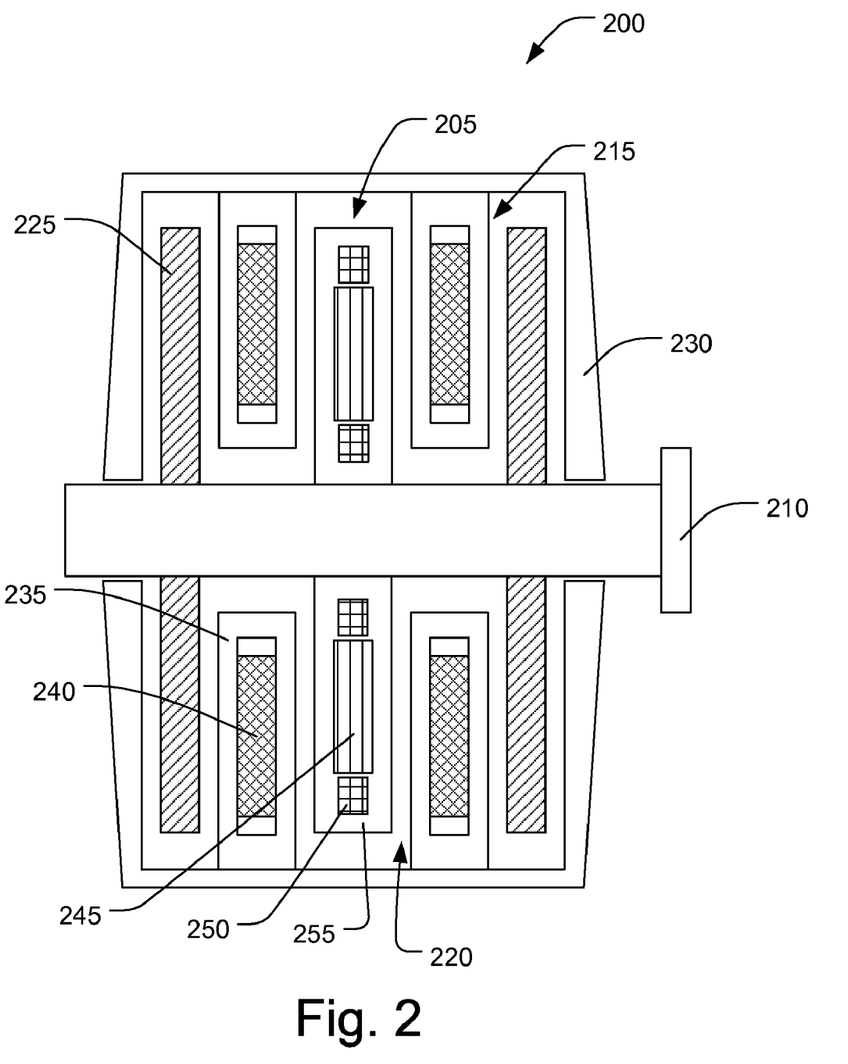
FIG. 2 is a cross sectional view of a motor/generator having an axial air gap topology in accordance with an aspect of the present invention.

Turning now to FIG. 2, a motor/generator 200 having an axial gap topology is illustrated. The motor/generator 200 includes a rotor 205 coupled to a drive shaft 210. At least one stator 215 is located near the rotor 205. For example, one stator can be located adjacent to an inner radial side of the rotor 205 while another stator can be located adjacent to an outer radial side of the rotor 205. An air gap 220 located between the rotor 205 and the stator(s) 215 is large enough to keep the rotor 205 and stator(s) 215 apart but narrow enough to provide satisfactory performance of the motor/generator 200.

Eddy current losses are commonly found in synchronous motors having such an air-core geometry. In conventional air-core motors, magnetic flux passes across an air gap that separates stationary and moving components of the motors. The magnetic flux generates eddy current losses, particularly at end windings and core end regions of the motor, thus, reducing efficiency of the motor. To mitigate such eddy current losses, the motor/generator 200 of the present invention includes at least one rotating back iron 225. The rotating back iron(s) 225 can be formed from a plurality of axially stacked thin metal sheets sandwiched together and clamped by bolts or rods extending axially through the back iron(s) 225. The back iron(s) 225 is coupled to the drive shaft 210 of the motor/generator 200 and is rotating with rotor 205. Because the back iron(s) 225 is not stationary, DC fields, rather than AC fields, are produced by rotating windings and/or magnets in the rotor 205. Accordingly, AC losses in the back iron will be mitigated and hence axial gap and radial gap topologies described herein facilitate improved flux containment over conventional topologies. An additional benefit of rotating the back iron in an axial gap machine is that the motor/generator is significantly easier to manufacture. Conventionally, in order to laminate the back iron in axial gap machines, the back iron is laminated axially, in the form of a spiral winding of magnetic material. By rotating the back iron, the back iron does not need to be laminated in such a fashion. Thus, the back iron can be constructed from more conventional laminations.

The motor/generator 200 further includes a frame 230 to house the rotor 205, the stator(s) 215, and the back iron(s) 225. The stator(s) 215 can be a conventional stator for providing electric power in response to a rotation of the rotor 205. Alternatively, the stator(s) 215 can be a single-phase or multi-phase apparatus and can have any number of poles. The stator(s) 215 comprises a support structure 235 and stator windings 240 for generating an AC rotating field located within the support structure 235. The support structure 235 can be of any suitable structure capable of supporting the stator windings 240.

The stator windings 240 are generally formed by winding coil wire onto a non-conducting (e.g., fiberglass) solid or laminated winding support structure, so called air cores. Passage of current through the wire will establish a magnetic field. The field rotates in accordance with principles of a synchronous motor/generator due to the configuration of the stator windings 240 and due to the control of current through the windings 240. The rotating back-iron 225 acts as a flux return path to maximize flux density in the air gap 220 and minimize flux 'leakage' which could affect nearby components. For more successful shielding outer magnetic field such a back-iron could have different forms: for example T-shaped cross-section and so on. The coils can be held in place by fixturing straight portions of the windings 240 to slots in an inner radial surface of the support structure 235 and by mechanical hangers and/or rope or fabric in end winding areas.

The rotor 205 can include at least one permanent magnet 245 and rotor windings 250. It is to be appreciated that the rotor windings 250 can be conventional windings or superconducting windings. The permanent magnet(s) 245 and rotor windings 250 cooperate to generate a DC magnetic field for the rotor 205. The permanent magnet(s) 245 and rotor windings 250 are supported by support structure 255. The support structure 255 can be stainless steel, aluminum, or other non-magnetic material. Alternatively, the support structure 255 can be a ferromagnetic material.

The permanent magnet(s) 245 provides significant advantages for the design or construction of the motor/generator 200. For example, in a superconducting synchronous machine, the permanent magnet(s) 245 allows for less superconducting wire, which may be costly, to be utilized in the rotor windings 250. The wires associated with the rotor windings 250 are expensive and must be cooled by a cooling system. Additionally, the more current provided through the windings 250, the greater the cooling load on the motor/generator 200.

The permanent magnet(s) 245 also facilitates operation of the motor/generator 200 when the rotor windings 250 are not operational. For example, if a fault occurs with respect to the rotor windings 250 or if a cooling system fails, the rotor 205 can operate based on a magnetic field produced by the permanent magnet(s) 245. Thus, the permanent magnet(s) 245 can provide a fail safe operational mode for the motor/generator 200. In a fault situation, such as a short circuit on the stator 215, the magnetic field of the magnet(s) 245 can be opposed by the rotor windings 250. The opposition of the field associated with the permanent magnet(s) 245 can be achieved by employing a reverse current direction in the rotor windings 250 (e.g., by changing polarity slip rings or by action of a rotating controlled rectifier). In another alternative, which utilizes a flux pump design to provide current to the rotor windings 250, the magnetic field can be mitigated by changing the polarity of magnets of the flux pump. Such a demagnetization process can also be employed to demagnetize the permanent magnet(s) 245 for repair, disassembly, and assembly purposes.

The permanent magnet(s) 245 can also facilitate reduction of flux density perpendicular to the rotor windings 250. The rotor windings 250 comprise a tape structure, which operate poorly with magnetic fields perpendicular to the tape. The permanent magnet(s) 245 operates to shape the field to minimize perpendicular fields on the rotor windings 250. Thus, field sculpting is effectuated such that magnetic fields perpendicular to the windings 250 are significantly reduced. A further benefit of the permanent magnet(s) 245 is that the rotor 205 can be configured with the permanent magnet(s) 245 in a non-magnetized state. The rotor windings 250 can then be employed to magnetize the permanent magnet(s) 245.

The permanent magnet(s) 245 can be of any suitable type depending on the type of motor/generator the magnet(s) 245 are employed in. For example, if the permanent magnet(s) are employed in a superconducting motor/generator, the magnet(s) should be effective at low temperatures, such as cryogenic temperatures. For example, the permanent magnet(s) 245 can be a rare earth material, such as samarium cobalt (Sm—Co), praseodymium iron boron (Pr—Fe—B) or mixtures of praseodymium and neodymium iron boron (Pr (Nd)—Fe—B). Further, the permanent magnet(s) 245 can be of any suitable shape, standard or non-standard, and is contemplated as falling within the scope of the present invention.

In a superconducting motor/generator, a cooling, or refrigeration, system (not shown) can also be coupled to the rotor 205 to facilitate the operation of the rotor windings 250 and the permanent magnet(s) 245 at an appropriate temperature. For example, cryogenic temperatures, such as 20-40K, can be employed. However, it is to be appreciated that other temperatures can also be utilized. Advancements in superconducting winding technology may allow the rotor 205 to operate at higher temperatures, such as 77K.

Figure 3:
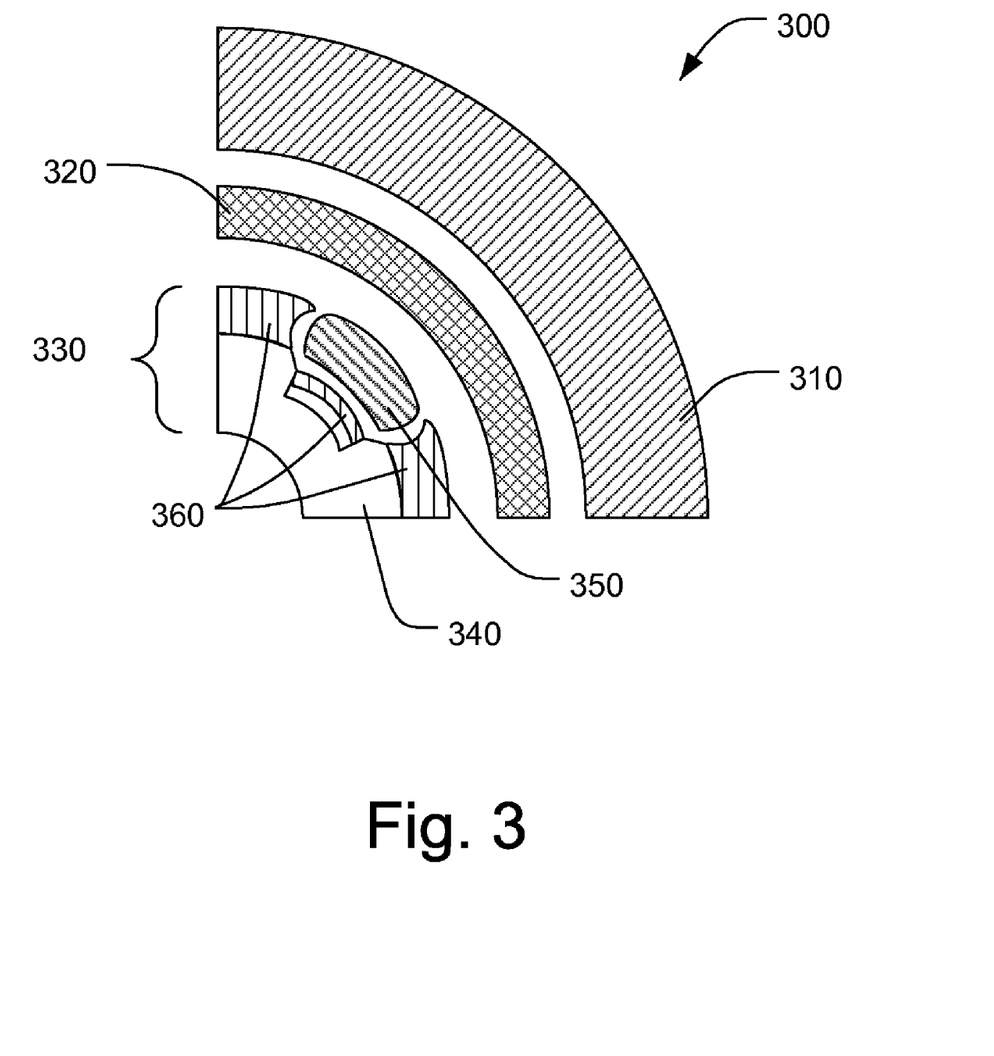
FIG. 3 is a cross sectional view of a motor/generator employing permanent magnets in accordance with an aspect of the present invention.

Turning now to FIG. 3, a one quarter portion of a four pole radial gap motor/generator 300 is depicted. The motor/generator 300 comprises a cylindrical outer shell or core 310. The core 310 contains a stator 320 and a rotor 330. The rotor 330 can be provided in a vacuum jacket (not shown), which is coupled to a cooling, or refrigeration, system. The rotor 330 comprises an inner core 340, superconducting windings 350, and permanent magnets 360. In this example, the magnets 360 are provided as four magnets located at four quadrants of the motor/generator 300. However, it is to be appreciated that the permanent magnets can be of any number of magnets and can also be arranged as sets of magnetic elements and have various forms. Similarly, four superconducting windings 350 are located at four quadrature locations. The permanent magnets 360 and superconducting windings 350 are provided around the inner core 340, which can serve as a rotor body or assembly. The inner core 340 can be a non-magnetic or magnetic cylindrical material and may be thinner than the outer core 310.

The permanent magnets 360 can be located in a d-axis of the rotor pole. The d-axis corresponds to an axis of symmetry for poles of the rotor 330. The permanent magnets 360 can be disposed in a middle portion of oval-shaped superconducting windings 350. The superconducting windings 350 generally have 33-40% of empty space at their centers. As the permanent magnets 360 can have a coercive force of more than 1 million A/m, special equipment for stabilizing the magnets 360 may be necessary if the magnets 360 are installed after magnetization. To mitigate the need for the special equipment, the permanent magnets 360 can be magnetized after the superconducting windings 350 and the magnets 360 are attached to the inner core 340. Depending on the material utilized, the permanent magnets 360 can have a high performance in low temperature zones. Accordingly, the magnets 360 can be placed in the lowest temperature zone associated with the rotor 330. In addition, ferromagnetic material in combination with the permanent magnets 360 can be placed in a direct and quadrature axis of the poles of rotor 330 to increase the used magnetic flux and decrease the flux density perpendicular to the superconducting tape associated with the windings 350.

Figure 4:
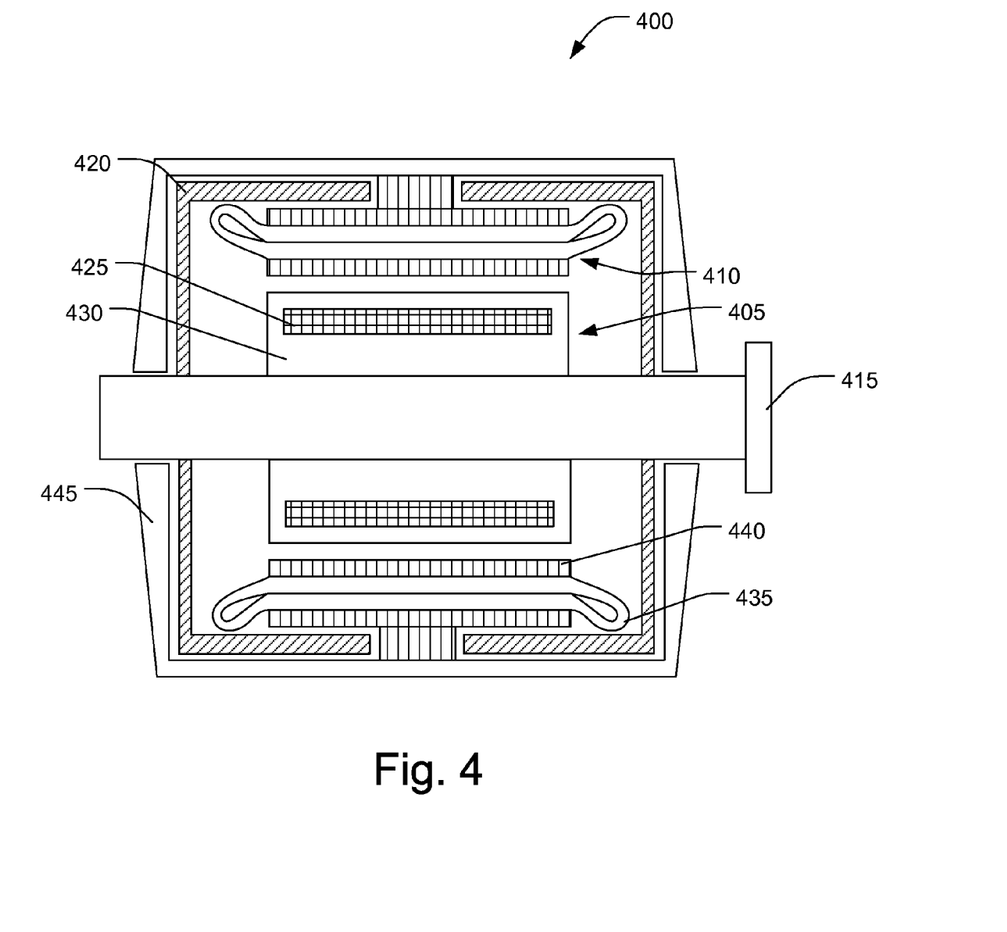
FIG. 4 is a cross sectional view of a motor/generator having a radial air gap topology in accordance with an aspect of the present invention.

Turning now to FIG. 4, a motor/generator 400 having a radial gap topology is illustrated in accordance with an aspect of the present invention. Motor/generators having radial gap topologies comprise a different configuration of similar motor/generator components than motor/generators having axial gap topologies. However, the benefits of employing a rotating back iron, as described above, can still be realized with the radial gap topology. The motor generator 400 comprises a rotor 405 and a stator 410. The stator 410 is arranged concentrically about the rotor 405. At a center of the rotor 405 is a drive shaft 415. The rotor 405 is coupled to the drive shaft 415 such that the rotor 405 is operable to rotate with the drive shaft 415. At least one back iron 420 is also coupled to the drive shaft 415. Thus, the back iron(s) 420 can rotate with the rotor 405. Such rotation of the back iron(s) 420 mitigates eddy current loss in the motor/generator 400 for analogous reasons described above. Although the back iron(s) 420 is depicted as two substantially L-shaped cross-section structures in FIG. 4, it is to be appreciated that the back iron(s) 420 can be of any suitable number, shape and/or size such that it is operable to rotate with the rotor 405 and mitigate eddy current losses in the motor/generator 400. Further, the rotating back-iron can mitigate losses due to not only internal but also external magnetic fields by means of optimum design. It could be used both by radial gap and axial gap motors/generators. The stator 410 is coupled to a motor frame 445 and thus, remains substantially stationary within the motor/generator 400.

The rotor 405 comprises rotor windings 425 and a support structure 430 for supporting the rotor windings 425. The rotor 405 can also include a vacuum jacket (not shown) surrounding the support structure 430 to thermally insulate the rotor windings 425 and support structure 430 from the environment. The rotor 405 can also include at least one permanent magnet (not shown). The motor/generator 400 can also be coupled to a cryogenic refrigeration system (not shown) for cooling the windings 425 of the rotor 405. The stator 410 comprises stator windings 435 and a support structure 440 for the stator windings 435. The rotor 405, stator 410, and back iron 420 are located within the frame 445 of the motor/generator 400.

Figure 5:
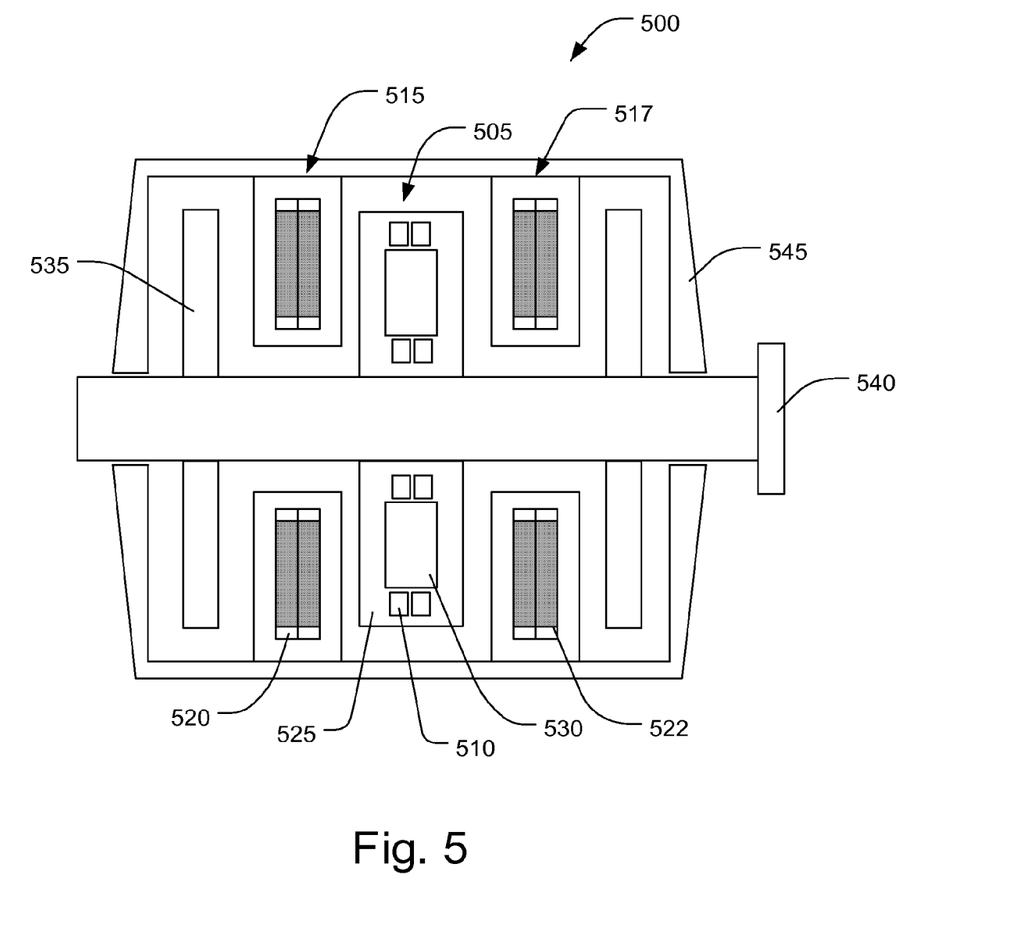
FIG. 5 is a cross sectional view of a motor/generator having another axial air gap topology in accordance with an aspect of the present invention.

FIG. 5 depicts another axial gap topology in accordance with an aspect of the present invention. Axial gap motor/generators are generally larger in diameter than radial gap motor/generators. There exist applications in which an axial gap motor/generator topology is preferred, yet due to the size, it is not practical, such as in pod-contained HTS propulsion motors. Thus, the present invention provides for a smaller diameter motor/generator 500 having an axial gap topology. The motor/generator 500 comprises a rotor 505 having at least two superconductor windings 510 located in proximity to each other and a stator 515 having at least two stator windings 520 located in proximity to each other. The rotor 505 can further include a support structure 525, which can be any nonmagnetic material support structure. The winding can comprise an iron magnetic core. Iron will generally increase the weight of the motor/generator 500, however iron facilitates a flux path and thus, less superconducting winding can be employed. Utilizing an iron core also provides a thermal reservoir which conducts heat away from conductors, allowing the motor/generator 500 to be driven harder than might otherwise be the case.

At least one permanent magnet 530 can also be included in the rotor 505. The permanent magnet(s) 530 operates to create a permanent field in the rotor 505, which also provides for a decrease in the need for superconducting winding. In conventional permanent magnet motor/generators, if a stator fault occurs, permanent magnets pump energy into the fault which can cause burn out. However, in the present invention, the superconducting windings 510 can demagnetize the permanent magnet(s) 530 during a fault, thus mitigating the pumping of energy into the fault.

The motor/generator 500 also includes a rotating back iron 535 coupled to a drive shaft 540, such that the back iron 535 rotates with the rotor 505. The back iron 535 rotates to mitigate eddy current losses in the motor/generator 500, as described above. The rotor 505, stator 515, and back iron 535 are located within a frame 545 of the motor/generator 500.

Figure 6:
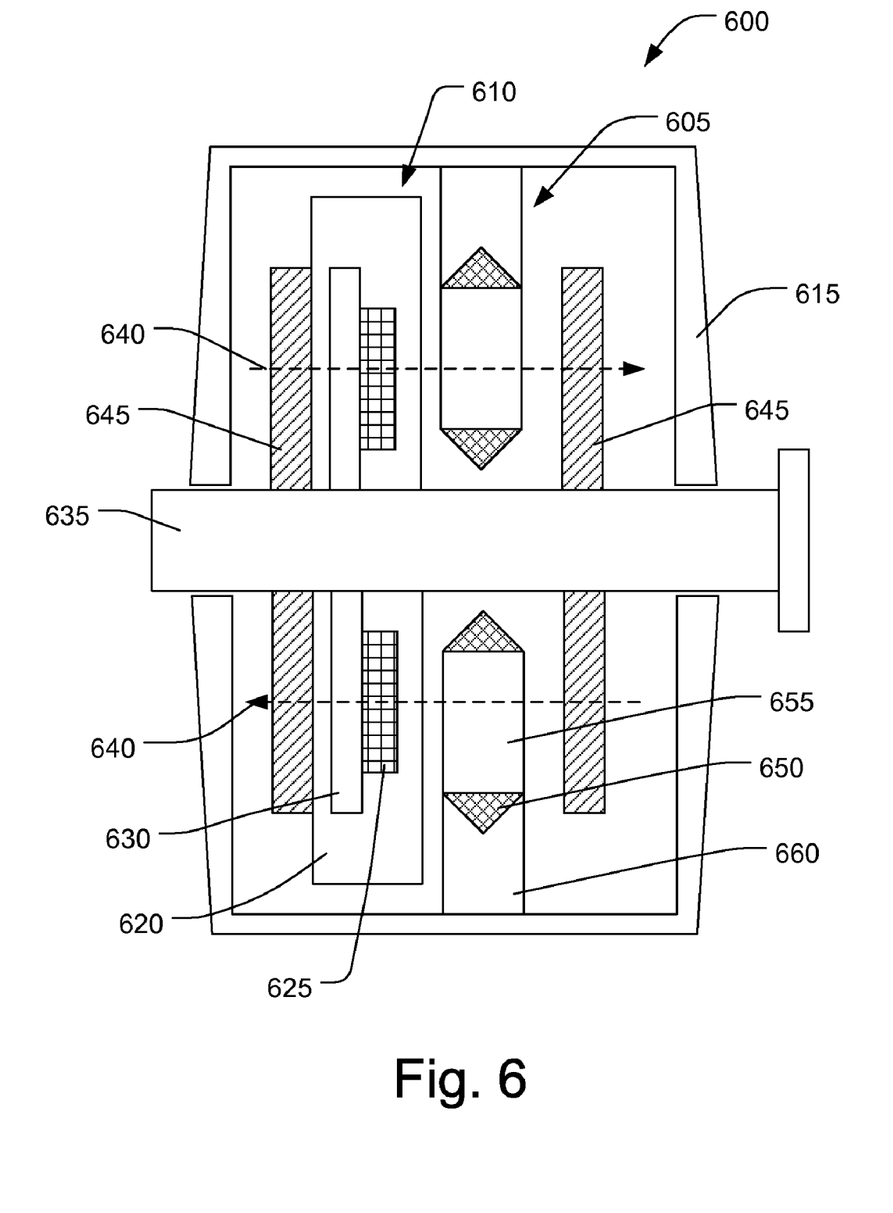
FIG. 6 is a cross sectional view of a motor/generator having another axial air gap topology in accordance with an aspect of the present invention.

FIG. 6 illustrates another superconducting motor/generator 600 having an axial gap topology. The motor/generator 600 comprises a rotor 610 and a stator 605 located within a frame 615. The rotor 610 includes a rotating cryostat 620 for facilitating cooling of superconducting windings 625 located within the rotor 610. The superconducting windings 625 are supported by a first support rotor structure 630, which is coupled to a rotating drive shaft 635. The superconducting windings 625 have positive and negative poles interchanging each other. Arrows 640 depict magnetic lines in the motor/generator 600. The magnetic lines 640 cross stator windings 650 and a magnetic flux is linked with the stator windings 650 by rotation of the drive shaft 635, which creates a voltage. The magnetic flux passes through a gap between two rotating back irons 645, as the flux penetrates the back irons 645. Accordingly, losses created by rotating magnetic field in the rotating back irons 645 are mitigated.

The stator 605 includes a stator support structure 655, such as a fiberglass disk structure, for supporting the stator windings 650. It is to be appreciated that the second support structure 655 can be composed of multiple segments which can be separated if necessary. The stator winding 650 comprises coils, which can be connected in at least two segments of the second support structure 655 separately. Connections are formed on an outer radius of the coils after the at least two segments of the second support structure 655 are assembled. The stator winding 650 can be disassembled after disconnecting leads and disassembling the at least two segments of the second support structure 655. The stator support structure 655 is preferably non-metallic and is supported by a support structure 660, which is coupled to the frame 615 of the motor/generator 600.

Figure 7:
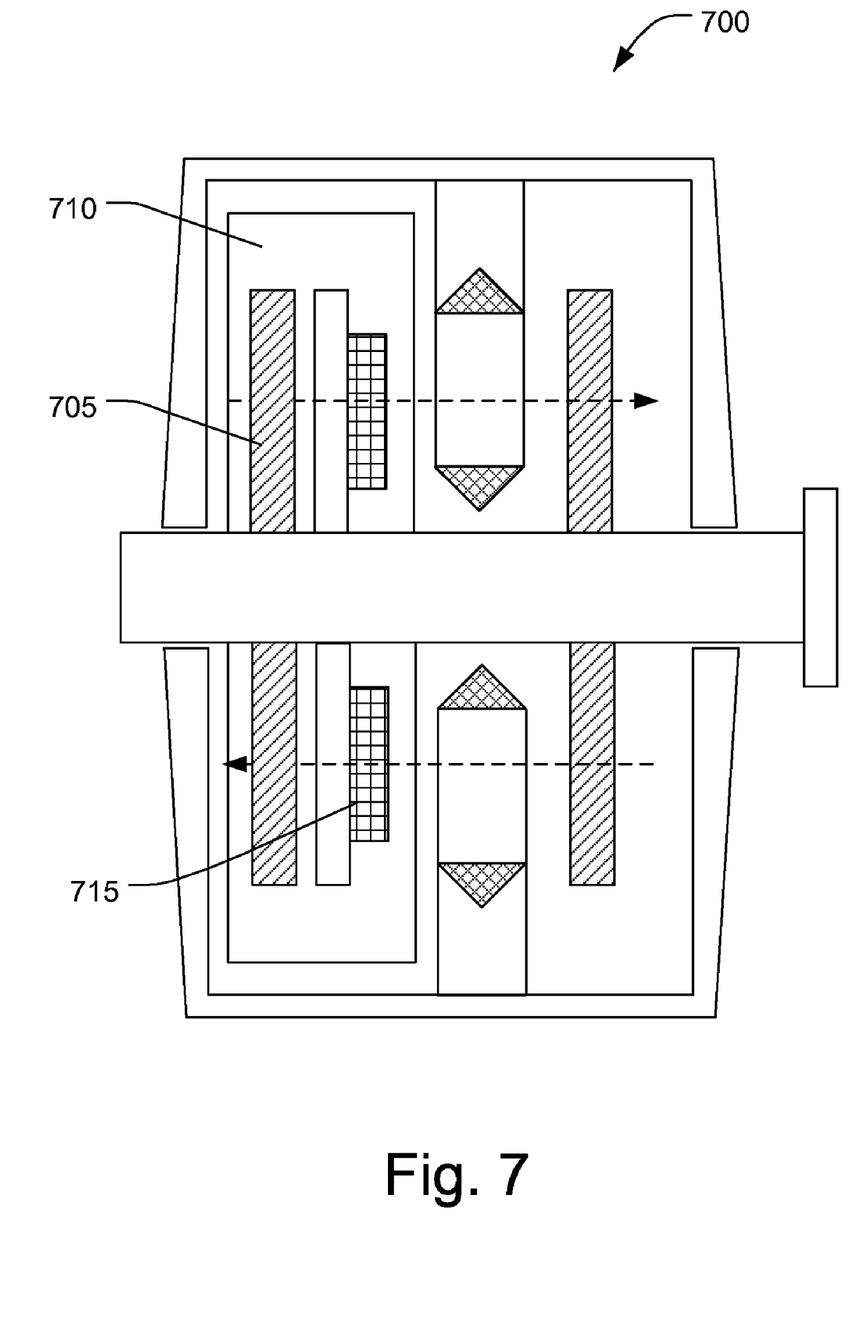
FIG. 7 is a cross sectional view of a motor/generator having another axial air gap topology in accordance with an aspect of the present invention.

Alternatively, a motor/generator 700 can be configured such that a back iron structure 705 is located in a cryogenic environment 710, as depicted in FIG. 7. Employing the back iron 705 in the cryogenic environment 710, creates a thermal mass in the cryogenic environment 710. Accordingly, if refrigeration is lost, the thermal mass facilitates maintaining a cool environment for a longer period of time. Another benefit of including the back iron 705 within the cryogenic environment 710 is that transient forces applied to superconducting windings 715 are decreased. Such forces applied to the superconducting windings 715 are proportional to magnetic flux density and line current density. The presence of the back iron 705 absorbs magnetic flux and thus, less force is applied to the superconducting windings 715.

Although the motor/generators of the subject application have been substantially described herein as superconducting motor/generators having superconducting windings, it is to be appreciated that synchronous machines having conventional windings can also be employed.

Figure 8:
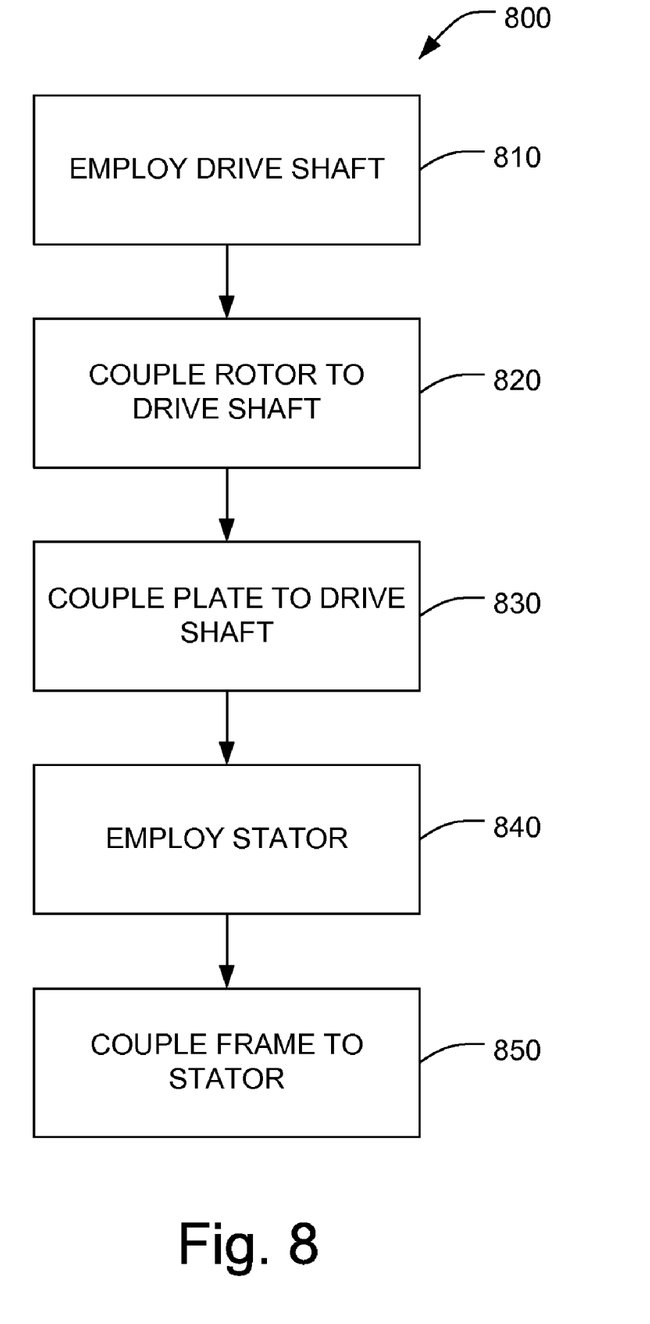
FIG. 8 is a flow diagram of a methodology for fabricating a synchronous motor/generator in accordance with an aspect of the present invention.
Figure 9:
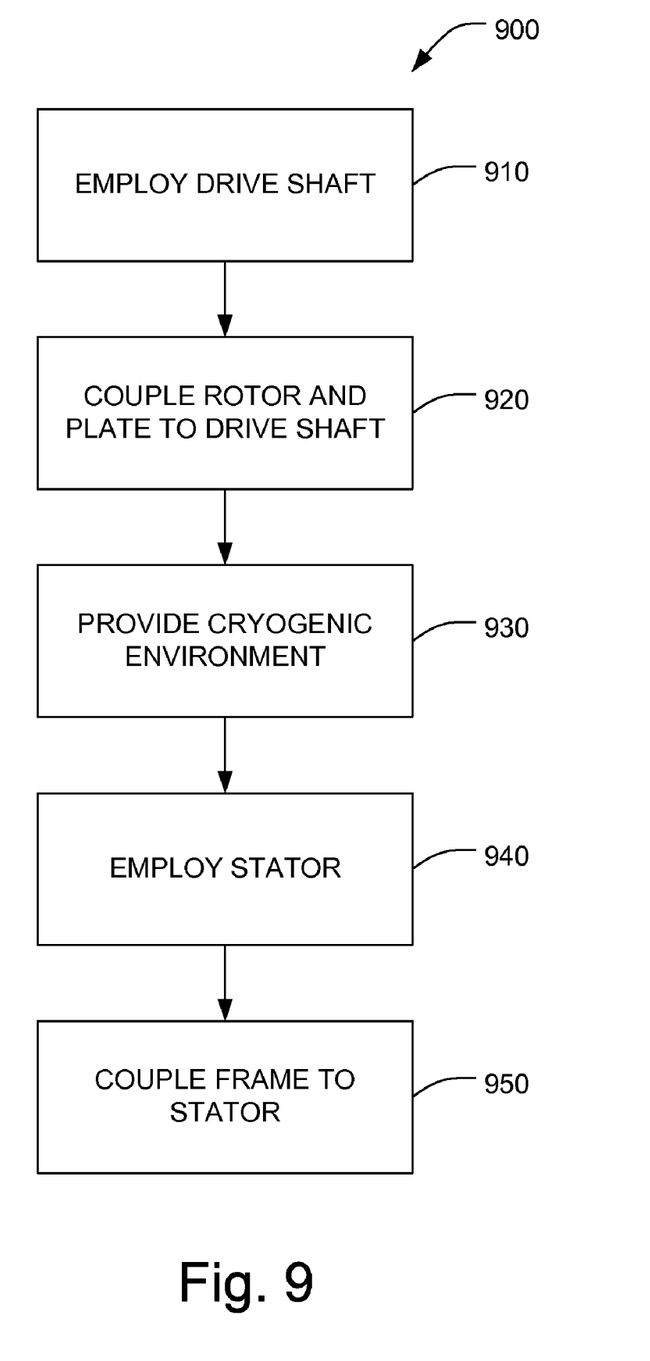
FIG. 9 is a flow diagram of a methodology for fabricating a synchronous motor/generator in accordance with an aspect of the present invention.

In view of the foregoing structural and functional features described above, methodologies in accordance with various aspects of the present invention will be better appreciated with reference to FIGS. 8-9. While, for purposes of simplicity of explanation, the methodologies of FIGS. 8-9 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

Turning now to FIG. 8, a methodology 800 for fabricating a synchronous motor/generator in depicted. The methodology begins at 810 where a drive shaft for the motor/generator is employed. At 820, a rotor is coupled to the drive shaft. The rotor can employ at least one permanent magnet which cooperates with rotor windings to generate a DC magnetic field for the rotor. Alternatively, the rotor can employ rotor windings without the permanent magnet(s). The rotor windings can be conventional windings or superconducting windings. Generally, when the rotor rotates, AC fields are created across stationary components of the motor/generator, producing eddy current losses. Accordingly, at least one back iron is coupled to the drive shaft of the motor/generator at 830 to mitigate such losses. The back iron(s) rotates with the rotor and thus, does not realize AC fields. At 840, a stator is employed and is selectively energizable with an electric current to drive the rotor to rotate. A frame is then coupled to the stator at 850, such that the stator remains stationary. The frame also provides protection for the motor/generator components from the environment.

FIG. 9 illustrates another methodology 900 for fabricating a synchronous motor/generator in accordance with an aspect of the present invention. At 910, a drive shaft for the motor/generator is employed. Then, at 920, a rotor and at least one back iron are coupled to the drive shaft. The rotation of the back iron(s) with the rotor mitigates the generation of eddy current losses in the motor/generator, as described in further detail above. At 930, a cryogenic environment is provided. The cryogenic environment substantially houses the rotor such that the cryogenic environment facilitates cooling of superconducting windings located within the rotor. It is to be appreciated that at least one back iron can also be included in the cryogenic environment for decreasing forces applied to the superconducting winding and for providing a thermal mass in the environment. At 940, a stator is employed and at 950, a frame for housing the motor/generator components is coupled to the stator.

It is to be appreciated that with respect to FIGS. 8-9, the motor/generator components can be configured in an axial gap topology, a radial gap topology, or any other suitable topology and is contemplated as falling within the scope of the present invention.

It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A synchronous motor/generator, comprising:
   a drive shaft;
   a rotor coupled to the drive shaft, the rotor comprising at least one rotor winding; and
   at least one back iron separating at least one stator winding and the at least one rotor winding from an outer motor frame such that the at least one back iron shields the outer motor frame from the at least one stator and rotor winding, the at least one back iron is coupled to the drive shaft and rotates with the rotor such that the at least one rotor winding generates DC fields when it rotates, to mitigate losses of a rotating magnetic field created by the at least one rotor winding; and
   the motor/generator is a superconducting synchronous motor/generator having an air-core geometry and a cryogenic environment for thermally insulating the rotor wherein the at least one back iron being located within the cryogenic environment.

2. The motor/generator of claim 1 having an axial gap topology.

3. The motor/generator of claim 1 having a radial gap topology.

4. The motor/generator of claim 1, further comprising a stator comprising the at least one stator winding for generating an AC rotating field.

5. The motor/generator of claim 1, the rotor comprising at least one permanent magnet for generating a DC magnetic field for the rotor.

6. The motor/generator of claim 1, the at least one rotor winding is a high temperature superconductor (HTS) winding.

7. The synchronous motor/generator of claim 1, further comprising, the at least one back iron is positioned so the surface of the at least one back iron facing in the direction of the at least one rotor winding is substantially perpendicular to the outer radial surface of the drive shaft, such that when the at least one back iron rotates with the rotor, the at least one rotor winding generates DC fields when it rotates, to mitigate losses of a rotating magnetic field created by the at least one rotor winding.

8. A motor/generator, comprising:
   a drive shaft;
   a rotor coupled to the drive shaft, the rotor having at least one permanent magnet and at least one rotor winding, the at least one permanent magnet provides a fail-safe operational mode for the motor/generator when the at least one rotor winding becomes inoperable;
   a back iron coupled to the drive shaft such that the back iron rotates with the rotor for mitigating eddy current losses in the motor/generator, the back iron is positioned to shield the frame from the at least one rotor winding and the polyphase stator winding so that the back iron mitigates the losses in a magnetic core, frame and stator winding support structure for a rotating magnetic field created by the at least one rotor winding and a polyphase stator winding; and
   the motor/generator has an air-core geometry.

9. The motor/generator of claim 8 being a superconducting synchronous motor/generator.

10. The motor/generator of claim 8, the at least one permanent magnet comprising rare earth and ferrite materials.

11. The motor/generator of claim 8, the at least one permanent magnet is disposed in a quadrature axis of poles of the rotor.

12. The motor/generator of claim 8, the at least one permanent magnet is magnetized by a superconducting winding after assembly of the motor/generator.

13. A motor/generator having axial gap topology, comprising:
   a rotor comprising an air core support structure and having at least two rotor windings located in proximity to each other, the rotor having opposite first and second faces defining parallel planes perpendicular to an axis of rotation of the rotor;
   a first stator having at least two stator windings located in proximity to each other;
   a second stator having at least two stator windings located in proximity to each other,
   the rotor is situated between the first stator and second stator in an axial direction with the first side face of the rotor located adjacent the first stator and the a second side face of the rotor located adjacent the second stator to facilitate decreasing an overall diameter of the motor/generator;
   at least one rotating back iron for mitigating eddy current losses in the motor/generator and for mitigating external end-zones rotating magnetic fields; and
   the motor is a superconducting synchronous motor with the at least one rotating back iron located within a cryogenic environment.

14. The motor/generator of claim 13, the rotor comprising an iron support structure.

15. The motor/generator of claim 13, the rotor comprising at least one permanent magnet for creating a magnetic field in the rotor.

16. A method for fabricating a motor/generator, comprising:
providing the motor with an air-core:
employing a drive shaft;
coupling a rotor to the drive shaft, the rotor comprising at least one rotor winding;
positioning a back iron between a outer frame of the motor and at least one stator and the at least one rotor winding such that the back iron shields the motor frame from the stator and rotor winding;
coupling a back iron to the drive shaft, such that the back iron rotates with the rotor, such that the at least one rotor winding generates DC fields when it rotates, to mitigate eddy current losses of a rotating magnetic field created by the at least one rotor winding;
placing the back iron within a cryogenic environment wherein the cryogenic environment cools the rotor.

17. The method of claim 16, the motor/generator being a superconducting synchronous motor/generator.

18. The method of claim 16, further comprising, coupling the stator to a frame of the motor/generator.

19. The method of claim 16, further comprising, coupling at least one permanent magnet to the rotor, and demagnetizing the at least one permanent magnet when a stator fault occurs.

20. The method of claim 16, further comprising, configuring the rotor and stator in an axial gap topology.

21. The method of claim 16, further comprising, configuring the rotor and stator in a radial gap topology.

22. The method of claim 16, further comprising, employing the motor/generator in a ship propulsion system.

* * * * *